Feb. 3, 1959   J. TOGGENBURGER   2,872,015
STEPWISE CARRIAGE POSITIONING MECHANISM AND RELATED FEATURES
Filed Dec. 29, 1954   3 Sheets-Sheet 1
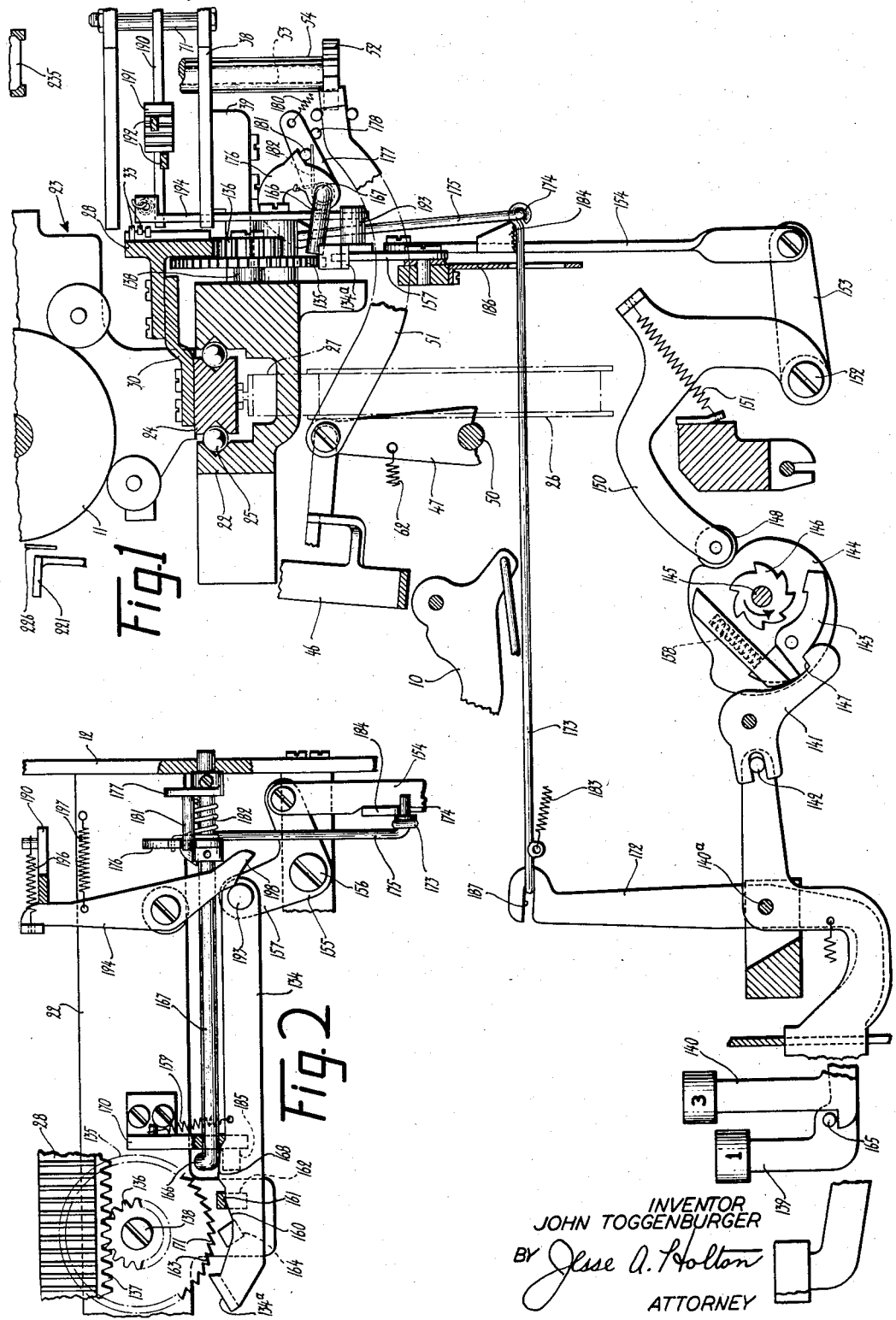
INVENTOR
JOHN TOGGENBURGER
BY Jesse A. Holton
ATTORNEY Feb. 3, 1959  J. TOGGENBURGER  2,872,015
STEPWISE CARRIAGE POSITIONING MECHANISM AND RELATED FEATURES
Filed Dec. 29, 1954  3 Sheets-Sheet 2
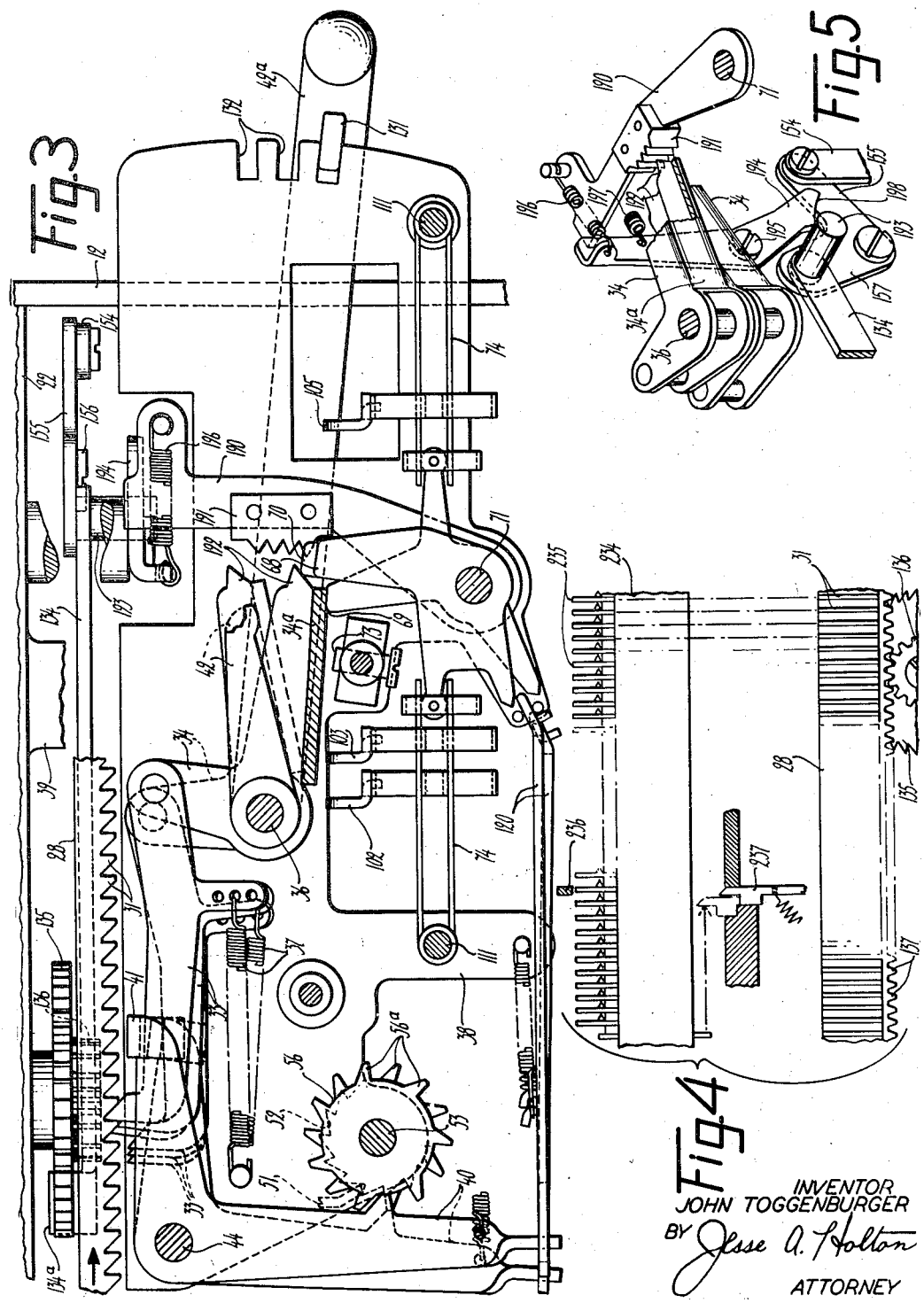
INVENTOR
JOHN TOGGENBURGER
BY Jesse A. Holton
ATTORNEY Feb. 3, 1959     J. TOGGENBURGER     2,872,015
STEPWISE CARRIAGE POSITIONING MECHANISM AND RELATED FEATURES
Filed Dec. 29, 1954     3 Sheets-Sheet 3
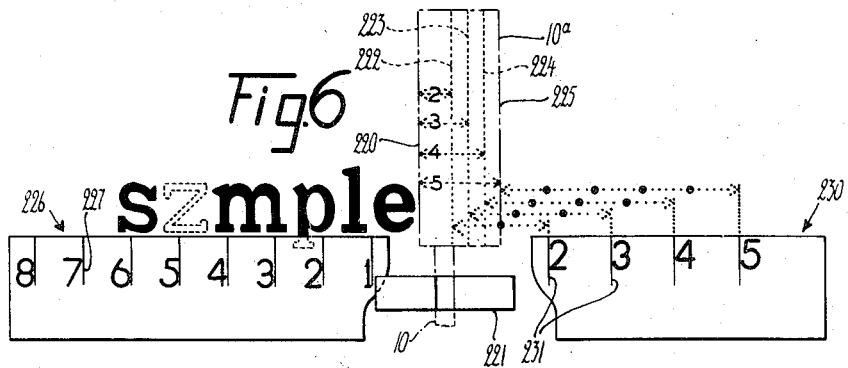
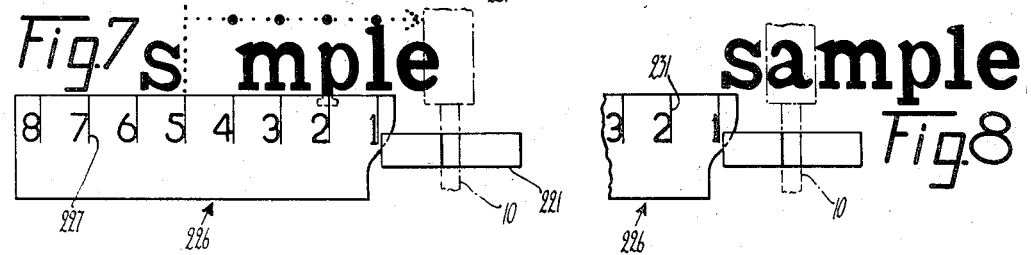
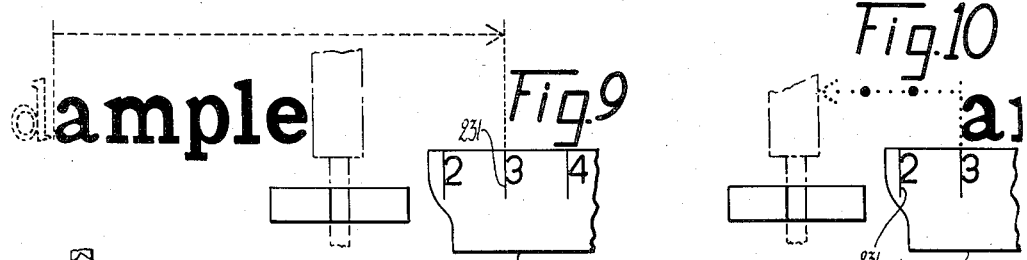
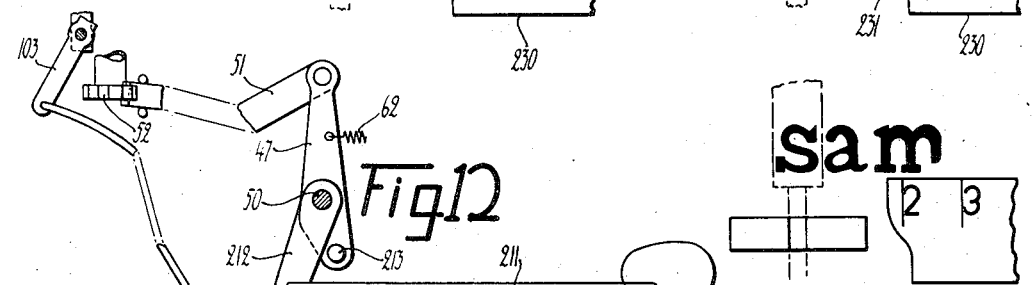
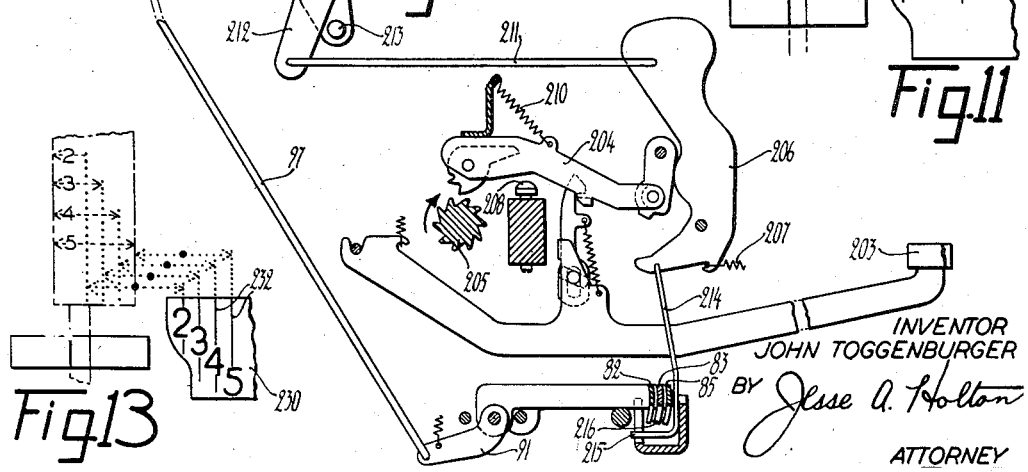
INVENTOR
JOHN TOGGENBURGER
BY Jesse A. Holton
ATTORNEY United States Patent Office 2,872,015
Patented Feb. 3, 1959

2,872,015

STEPWISE CARRIAGE POSITIONING MECHANISM AND RELATED FEATURES

John Toggenburger, Hartford, Conn., assignor to Underwood Corporation, New York, N. Y., a corporation of Delaware Application December 29, 1954, Serial No. 478,258

21 Claims. (Cl. 197—91)

This invention relates generally to typewriting and similar machines, and more particularly to mechanisms in such machines for stepwise positioning a letter-feeding carriage in different feed positions and also to index means whereby the operator by use of the stepwise positioning means is able to type substitute characters appropriately next to other characters. Certain features of the invention are particularly useful in connection with typewriting machines in which the carriage in response to each typing stroke is fed proportionally to the typed character, in multiples of fine, definite feeding increments.

Many forms of proportional letter-feeding mechanisms are known, and by way of example the improvements herein featured have been worked out in connection with the proportional letter-feeding structure disclosed in application No. 462,670 by the instant applicant, filed October 18, 1954. The machine of said application has a carriage which is urged constantly in letter-feed direction. Step movements of the carriage occur alternately under control of two dog means, the machine having a letter-feed rack and said two dog means being alternately brought into engagement with said feed rack at the successive typing operations and being controlled incidental to each such typing operation to pay out to the carriage a feed step which, in terms of the stated fine feeding increments, is generally proportional to the character that is being typed.

It will become evident hereinafter that certain features of the invention are capable of useful application in conventional, uniform spacing typewriting machines. Others are more closely related with proportional spacing typewriting machines in general, and still others have more specific relation to the type of alternately active dog means covered by the stated prior application. With this being understood, it is an important object of the invention to provide a simple and efficient mechanism to back space a letter-feeding carriage varying distances without chance for overthrow.

It is another object of the invention to provide efficient and simple key-conditionable mechanism to back space a carriage by motor power, varying distances, different numbers of definite feed increments.

A further object of the invention is to provide an accurately functioning back spacing mechanism, selectively controllable, and embodying a single power means to back space the carriage in steps of varying magnitudes.

It is also an object of the invention to provide an efficient overthrow-proof variable back spacing mechanism comprising a single back space pawl and preferably also only one actuating member.

In connection with proportional spacing typewriting machines, great difficulties are experienced by operators whenever an erroneously typed character is to be supplanted by a correct character. This is in view of the fact that the characters typed or to be typed are of varying widths and must appear irregularly spaced accordantly to their varying widths. Upon typing an erroneous character, the operator usually is unable to stop typing before several additional characters are typed. Also, the erroneously typed character may be at the beginning of a word, in which case the substitute character must be typed in correct relation to the left side of the second character of the word. More often however, the incorrect character is an intermediate or a final one, in which case it is most appropriate to type the substitute character properly correlated to the right side of the character which is to precede it.

In view of the smallness of the feed increments, operators of proportional spacing typewriters have in the past experienced great difficulty, loss of time and eye strain in making corrections, and towards eliminating the attendant drudgery and inefficiency, it is an important object of the invention to provide efficient simple and effective means for facilitating corrective character typing, accurate and fast positioning of the carriage in the correct incremental feeding position.

More specifically, it is also an object of the invention to provide a series of indices, or equivalent means, appropriately located along the typing line at uniform intervals of multiple increments to the left side of a typing location, the right side of the character to be followed by a corrective character being adapted to be lined up with any of such indices, there being provided a mechanism to back space the carriage thereafter in multiple incremental steps agreeing with the spacing of the said indices, so as to bring the carriage quickly and without guesswork accurately to the incremental position where the corrective character is to be typed.

Similarly it is an object to provide at the right side of the printing point a series of other indices, or equivalents, with reference to which the carriage in connection with a requirement for typing a corrective character immediately ahead of another character, such as at the beginning of a word, is accurately and conveniently positionable, so that thereupon feeding the carriage in terms of a given multiple feed increment will position it accurately and quickly for typing the corrective character.

Other objects and features will be apparent upon consideration of the detailed description which follows, as such description is read and stated in the light of the accompanying drawings.

Referring now specifically to the drawings:

Figure 1 is a right hand sectional side view illustrating the novel carriage back spacing mechanism of the invention and fragments of a carriage feeding mechanism, Figure 2 is a rear view showing portions of the back spacing mechanism seen in Figure 1, Figure 3 is a sectional plan view illustrating the proportional letter feed mechanism of the aforestated application Serial No. 462,670 and in operative association thereto portions of the stated back spacing mechanism, Figure 4 is a fragmentary rear view illustrating a carriage feed rack along with a correlated tabulator rack and a tabulator counterstop, Figure 5 is a rear perspective view of a portion of the proportional feed mechanism seen in Figure 3 and parts of the back spacing mechanism cooperatively associated therewith, Figure 6 depicts in front elevation a novel index means provided at the typing line, whereby accurate positioning of the carriage is facilitated for typing corrective characters, the indicated typed word requiring the substitution of an erroneously typed character by a corrective character, Figure 7 is a view similar to Figure 6, the erroneously typed character having been erased and the carriage positioned with reference to one of the indices so that thereafter uniform back spacing movements in a certain multiple of the feeding increment will speedily and accurately bring the carriage to the position whereat the corrective character is to be typed, Figure 8 is similar to Figure 7 but the carriage has been back spaced and the corrective character typed, Figure 9 is a front elevation similar to Figure 6, a first character in a word having been erroneously typed, and index means at the right side of the printing location being adapted to be used in a process by which the carriage will become located accurately to type the corrective character, Figure 10 is a view similar to Figure 9, the carriage having been located by reference to an index so that by feeding it in given multiple increment steps it will become positioned accurately for typing the corrective character, Figure 11 is similar to Figures 9 and 10, the carriage having been fed into position and the corrective first character of the word having been typed, Figure 12 is a fragmentary right-hand side-sectional view illustrating a carriage spacing mechanism, Finally, Figure 13 is a front view similar to Figure 9, showing a modified feature involving indices to facilitate the positioning of the carriage for typing corrective characters at the beginning of words.

*Proportional spacing typewriter*

Referring now to Figure 1, the machine of the invention embodies type bars 10 arranged in a usual arcuate array, and individually operable to type at a common general location against the front side of a platen 11. The said type bars 10 are power-actuatable under type-key control, in a manner not shown, but substantially disclosed in the patent to Yaeger No. 2,254,764, dated September 2, 1941. The said platen 11 is turnably supported on a carriage 23. The latter embodies a channel bar 24 guiding it on a trackway 22, there being anti-friction elements 25 provided between the trackway 22 and the said bar. The trackway 22 is part of a machine framework including also two spaced side walls, the left one of which is indicated at 12 in Figures 2 and 3. The carriage 23 is urged constantly by a spring motor 26, see Figure 1, in letter-feed direction, leftwardly as seen from the front, a draw-band leading from the spring motor having connection 27 with the carriage. However, movement of the said carriage 10 under influence of said spring motor 26, in letter-feed direction, is normally subject to the control of a proportional letter-feed mechanism which more particularly is the subject of said patent application Serial No. 462,670. This feed mechanism will now be briefly described.

As escapement rack 28 extends lengthwise of the carriage 23 and is supported thereon by several laterally spaced brackets 30 which are fast on and reach rearwardly from the carriage channel bar 24. The rack 28 has teeth 31 arranged lengthwise of the carriage at intervals corresponding exactly to a certain multiple of the increments in the terms of which the carriage is to be fed. In the embodiment of the invention shown, the teeth 31 occur at intervals of three of said increments. For cooperation with the rack teeth of the rack 28 there are provided two identical escapement devices which are alternately in control over the carriage. Each of said escapement devices comprises three dogs 33 which are substantially identical, except that they are of graduated lengths differing in terms of single increments. The three dogs 33 of each of the two escapement devices are pivotally carried on independent rocker elements 34. The latter comprise each two spaced walls connected by a web 34a, and are pivotally supported on a short vertical rod 36 rising from a horizontal bracket plate 38 which has support on bosses 39 extending rearwardly from the trackway 22, see Figure 1. Springs 37 individual to the dogs 33 bias them pivotally and individually toward the rack 28 and reversely to the carriage feed direction as indicated by an arrow on the rack 28 in Figure 3. At every typing operation the two sets of dogs 33 are alternated in respect to engaging said rack 28, whereby at alternate typing operations one or the other escapement device determines the feed-movement of the carriage. Although the rack 28 is of coarse pitch, it will be observed that when either of said sets of dogs 33 is thrown into engagement therewith, there will be effected a vernier engagement concordant with said increments. In the embodiment said increments are one third of the size of the intervals at which the rack teeth 31 are provided. There is individually associated with each set of dogs 33 a control element in the form of a bell crank 40, having a vertical tab 41 for forcing the dogs 33 related thereto free of the rack 28. The said bell cranks 40 are coaxially supported upon a stud 44 on the bracket plate 38 and either one may be normally in a position allowing spring-urged engagement of its related pawls with the rack 28, and the other bell crank being then in a position holding its related pawls 33 clear of the rack. The bell cranks 40 are reversed in position by the operation of a conventional universal bar 46 operable by any one of the type bars 10. Said universal bar 46 operates a rocker 47 about an axis 50 and restores under the tension of a spring 62. The rocker 47 has rearwardly reaching therefrom a pawl 51, to step move incidental to each typing operation a ratchet wheel 52 carried fast on the lower end of a vertical shaft 53. The latter is turnably accommodated in a vertical boss 54 of the bracket plate 38 and has at the level of each bell crank 40 a toothed wheel 56, such wheels having each half the number of teeth which said ratchet wheel 52 has. Moreover, the teeth of the two wheels 56 are circumferentially interspersed with respect to each other. The arrangement is such that under control of the interspersed teeth 56a on the two wheels 56, incidental to each tooth advance of the ratchet wheel 52, the bell cranks 40 become reversed in position. Either of the sets of dogs 33, when moved free of the rack 28 by the pertinent bell crank 40, moves under the influence of its related springs 37 counter to the carriage feed direction until the web 34a of the supporting rocker 34 limitedly engages an abutment arm 42, there being one such abutment arm for each of the rockers 34 and both being carried fast on the short vertical shaft 36 and adjustable by a lever 42a, the function of which is to set the machine for expanded spacing. In Figure 3 the lower set of dogs 33 is shown as having moved counter to the feed direction, limitedly, as controlled by the lower rocker 34 striking against its abutment arm 42. At every typing stroke the positions of the bell cranks 40 become reversed and the set of dogs 33 which incidental thereto becomes engaged with the rack 28 is then instrumental to restrict the spring drawn movement of the carriage in accord with the condition of a differentially controlled stop means. This stop means comprises for each escapement rocker 34 a set of three independently swingable stop elements 69, 68 and 70, all said stop elements being pivotally carried on a stud 71 rising from the plate 38. Said elements respectively restrict rocker movement to produce two, three and four-increments letter-feed steps. Two abutments 73 on a post, individual to the bell cranks, are limits for five-increments movements. Individual two-legged spring elements 74 carried and adapted to swing about studs 111, are controlled by levers 102, 103 and 105 to exert normally a bias respectively on said stop elements 70, 68 to urge them to the respective positions in which they are shown in Figure 3. The normal tendency of both the four-increments stop elements 69 is to stand in the path of their rockers 34 and the normal tendency of the stop elements 68 and 70 is to stand clear. At each typing operation the stop elements associated with the rocker 34 which is to execute the space-measuring stroke in accompaniment therewith are so controlled that the appropriate stopping condition for such rocker will prevail for the carriage to execute a feed movement proportional to the character that is being typed. This is done under the control of bails 82, 83 and 85, which are variously subject to operation by certain of the operating actions, not shown, for the type bars 10. The bail 82 becomes operated incidental to each typing stroke calling for a two-increments carriage movement, and the bails 83 and 85 become operated respectively incidental to each typing stroke calling for a three or a five-increments carriage movement. Since the four-increments stop elements 69 stand normally in effective positions, no bail is needed to effect movement thereof to such position. Individual operating trains from the bails 82, 83 and 85, respectively to the levers 102, 103 and 105 include each an arm 91 and a link 97.

It will now be seen that normally always one of the sets of dogs 33 resides in mesh with the rack 28 and the other set of dogs is idly poised ready for engagement with said rack and movement from an initial space measuring position given by the related stop arm 42. At each typing operation the set of dogs 33 which is poised ready for engagement is moved into engagement, and the other set of dogs is moved out. The newly engaged set of dogs 33, by reason of its restricted capacity for movement, as determined by the stopping condition afforded by the elements 68, 69, 70 and 73, then measures out to the rack 28, and therefore to the carriage, the required proportional feed movement. Each stopping condition set up by elements 68, 69, 70 is temporarily retained by detenting slides 120, there being one such slide controlled by each one of the bell cranks 40.

The lever 42a by which the stop arms 42 are adjustable, has a tooth 131 for position-locking engagement in various notches 132 provided in the plate 38. For normal proportional spacing, the said lever 42a is locked in the position seen in Figure 3, and if placed to lock in successively adjacent notches the proportional feed will be increased by single feed increments.

*Back spacing mechanism*

The back spacing mechanism comprises a pawl 134 adapted under keyboard control to impart either a one-increment or a three-increments back spacing movement to the carriage. Said pawl 134 has an offset end 134a for engagement with a ratchet wheel 135, the latter of which along with a gear pinion 136 is turnable as a single unit, said pinion being in geared mesh with a rack 137 or succession of the teeth formed along the lower edge of the feed rack 28. The said ratchet wheel 135 and said pinion are turnable upon a headed stud 138 rigidly projecting from the track bar 22. The teeth of said ratchet wheel 135 are provided concordant with the feeding increments, that is the ratchet wheel travels three teeth while the feed rack 28 travels a single tooth 31. To institute back spacing operations, the keyboard embodies near the left side of the machine a one-increment back space key lever 139 and also a three-increments back space key lever 140, both being spring restored, and both being pivoted on a rod 140a. The three-increments back space key is in control over a hook shaped arm 141 by means of a pin-and-fork connection 142. Normally the hook of the arm 141 is contacted by and holds unclutched from a toothed wheel 146, a clutch pawl 143 carried on a rotary cam element 144. The latter is turnably carried on a round shaft 145 of the toothed type action operating shaft shown in said patent to Yaeger No. 2,254,764 and continuously turning while the machine is in use, said toothed wheel 146 being fast on said shaft end 145 to turn therewith and being axially adjacent to said cam 144. Normally the dog 143 is swung free of the toothed wheel 146 for the reason that a shoulder 147 thereon has been intercepted by the control arm 141.

Normally bearing down on a low portion of the cam 144 is a cam follower roller 148 carried on an arm 150 which is biased by a spring 151 to lie on said cam. The said arm 150 is carried on a stationary pivot stud 152 and has associated for unitary swinging movement therewith a rearwardly reaching arm 153 which by a link 154 has connection with a bell crank 155 pivotally carried on a frame supported pivot stud 156. An up-reaching arm 157 of the bell crank 155 has pivotally outreaching in an underlying relation to the ratchet wheel 135 the said aforementioned back space pawl 134.

When the back space lever 140 is operated, the hook arm 141 swings clear of the clutch pawl 143, causing the latter to be engaged with the toothed wheel 146 by the tension of a spring 158, so that the cam 144 is then clutched to said wheel 146 and turns therewith. Consequently turning the cam 144 will force the arm 150 rearwardly until the crest of the cam is reached and then during a late part of the turn the arm 150 restores under the power of the spring 151. If the key lever 140 is released before a full revolution of the cam 144 has taken place, then there will occur a disengagement of the clutch pawl 143 at the end of the turn, the said arm 150 in such case receiving a single reciprocation. Depending on how long the lever 140 is held operated, the cam 144 can be controlled to cause as many reciprocations of the arm 150 as are required for the number of back spacing steps that are desired.

If the operation of the back space pawl 134 is effected under control of the back space key lever 140 as just stated then the path which the tooth-engaging end 134a of the back space pawl 134 takes is controlled by co-operation of an edge 160 on the pawl with a face 161 afforded by a stationary stud 162, there being a spring 159 urging the pawl 134 upwardly for said edge 160 to follow resiliently the face 161. Thus in any operation so effected the pawl end 134a will be guided to ride into engagement with a wheel tooth at the location 163. After the offset pawl end 134a has back spaced the wheel 135 to the extent of three teeth, it engages a stop pin 164 which cams it solidly into said wheel thereby stopping said wheel and the carriage against overthrow.

After the carriage has been stopped against overthrow, the back spacing mechanism, under the tension of the spring 151, restores to normal position during completion of the revolution of the cam 144. Providing the back space key lever 140 has been released, the pawl 143 will be intercepted by the arm 141, and the cam 144 comes to rest in the normal position seen in Figure 1. If the key lever 140 is maintained depressed beyond the completion of a turn of the cam 144, then the latter will receive another turn or turns until such time as the key lever is restored and causes the clutch pawl 143 to be intercepted. This of course means that repeat turns of the cam result in repeat back spacing operations.

The pin 162 and the stop pin 164 are both fast on a downreaching flange of the trackway 22. Moreover, the face 161 is afforded by a slot wherein the back space pawl 134 has operating guidance.

The single increment back space key lever 139 has a pin 165 overlying the key lever 140 so that also its operation, through the lever 140, effects a clutch closing operation of the arm 141. It follows thus that also upon the operation of the one units back space key lever 139 the back space pawl is also power operated by the cam 144. However, at the very outset of such power operation a shaft 167 is rocked to move an arm-end 166 from the position seen in Figures 1 and 2, downwardly to contact an edge 168 of the pawl 134. Thereafter, the pawl 134 is guided by the coaction of the edge 168 with said arm-end 166, in a path for the pawl end 134a to ride into engagement with the wheel tooth located at 171 in Figure 2. This provides that the wheel 135 will be back spaced one single tooth space, overthrow of the pawl 134 and the wheel 135, exactly as in the case of a three-increments back spacing operation, being prevented by the stop pin 164. The shaft 167, near the wheel 135, is rockably supported by means of a bracket 170 on the trackway 22. The other end of the shaft 167 is rockably supported in the side wall 12 of the machine. The back space key lever 139 has an upreaching arm 172 to draw a link 173 forwardly from the position seen in Figure 1. At the rear end, the said link 173 is pivotally connected to a horizontal pin-end 174 of a generally vertical link 175 the latter being pivotally pendent from an arm 176 having pivotal support on the shaft 167. Fast on the shaft 167 and closely neighboring the arm 176 is another arm 177 which normally under the tension of a spring 180 rests against a stop pin 178 and thereby determines the normal position of the arm-end 166 of the shaft 167. The arm 176, under the tension of a strong torsion spring 182, tends to remain in contact with a pin 181 on the arm 177. The link 173 influenced by a spring 183 has normally the position seen in Figure 1, holding the pin end 174 of the link 175 clear to the rear of an ear 184 on the back space actuating link 154. By the operation of the key 139 the pin 174 becomes positioned under the ear 184 and immediately as the cam 144 begins to turn, the ear 184 starts to carry the link 175 downwardly. During the very initial downward movement of the link 175 the shaft 167 turns to place its arm-end upon the pawl edge 168. The arm-end 166 then limitedly contacts a pin 185 which is fast on the bracket 170. Meanwhile the back space pawl 134 has been traveling clear of the wheel 135 under the control of the edge 160 riding along the face 161. During the remainder of the operation of the back space pawl, the face 168, guided by the arm-end 166 of the shaft 167, causes the pawl end 134a to be led so that it engages a tooth at the location 171, one tooth space from the end of the stroke and turns the wheel 135 one single tooth.

In the stated operation, after the shaft 167 has been turned to the limit of the pin 185, the downward actuation of the link 175 continues idly, the spring 182 allowing the arm 176 to be further operated without carrying the arm 177 therewith. A frame supported bracket 186 has a vertical slot wherein the rear end of the link 173 has vertical guidance.

The ear 184 is serrated so that after it descends on the pin 174, such operating relation will continue to exist for the full back space actuating stroke even though the key lever 139 may be released immediately after operation. Restoration of the key lever 139 independently of the link 173 and the link pin 174 is facilitated by the key lever arm 172 having a one-way acting connection 187 with said link 173. Of course, always if the key 139 has been released, the link 173 restores rearwardly at the conclusion of a power turn of the cam 144.

After each back spacing operation the carriage 23 must be held in the appropriate incremental feed position. It will be remembered that the carriage feed mechanism comprises two identical escapement devices which are alternately in control over the carriage. Also it will be recalled that these escapement devices include each a rocker element 34 and that the rocker element of the escapement which happens to be in control of the carriage may have one of several positions as determined by the differential stop means comprising the stop elements 68, 69 and 70.

Mechanism is provided whereby as the carriage 23 receives back spacing motion, the rocker element 34 of the active escapement is automatically held stationary. This provides that in each back spacing operation the dogs 33 which happen to bear resiliently against the feed rack 28 will ratchet over the rack teeth 31 and will be appropriately in control over the rack 28 as the back space pawl 134 returns to normal position. The mechanism for holding the rocker element 34 of the active escapement includes an arm 190 which is pivotally mounted on the stud 71 midway between the two sets of stop elements 68, 69 and 70 and carries fast thereon a saw-tooth shoe 191 of sufficient breadth to engage a pointed tooth 192 on either one of the rocker elements 34. The said arm 190 has normally the position seen in Figure 3 whereby in the shoe 191 is free of the bell crank teeth 192. In all back spacing operations, and before the carriage moves, during an initial movement of the back space pawl 134 a head 193 on the mounting pin for the pawl 134 displaces rapidly a lever 194 about a stationary fulcrum pin 195, anticlockwise with respect to Figure 2, to draw the arm 190 by a spring 196 resiliently anticlockwise of Figure 3. This brings the shoe 191 into toothed interlock with the tooth 192 of which ever rocker element 34 belongs to the active escapement device. The shoe arm 190 is normally held in the idle position seen in Figure 3 by the lever 194 which under the tension of a spring 197 is urged to the normal position seen in Figure 2, resting against the head 193. The teeth of the shoe 191 are appropriately spaced to hold the active rocker element 34 in whatever position it may occupy, and it will be seen that the inactive rocker element 34 is out of cooperative range with the shoe 191. Always the rocker element 34 of the active escapement device will be held or detented before actual back spacing movement of the carriage starts. During the remainder of the back space actuating stroke the pin head 193 may ride idly along a dwell 118 holding the shoe 191 operated, it needing to do no further work.

*Advance spacing mechanism*

Referring now to Figure 12, the machine embodies also mechanism to advance-space the carriage. Such mechanism may include a three-increments spacing key 203, which, when operated, draws an actuator 204 into motion-receiving relation with a toothed power roll 205 which turns unitarily with the toothed wheel 146 of the back space actuating mechanism. When engaged with said toothed roll 205, the actuator 204 receives an operating stroke resulting in an operation of a lever 206, clockwise of Figure 12, against the tension of a return spring 207, the said actuator 204 becoming automatically disengaged by deflecting encounter with an abutment 208 and returning then automatically to the normal position under the tension of a spring 210. The lever 206 by a wire link 211 operates an arm 212 which is pivoted coaxially but independently of the universal bar rocker 47. The latter has a stud 213 whereby it is operable by the arm 212. It follows thus that resultant to any operation of the advance-space key 203 there ensues a power operation of the rocket 47 so that the pawl 51 imparts a step rotation to the wheels 56, thereby causing a substitution of one of the sets of feeding pawls 33 for the other in the feed rack 28. The power operation of the lever 206 results also in an upward operation of a link 214 which has a lower end 215 underlying a downreaching lug 216 on a space selecting bail 83, the latter along with two other bails 82 and 85 being part of the proportional letter-feed controlling mechanism fully disclosed in said co-pending application Serial No. 462,670. The bail 83 thus operated swings an arm 91 downwardly to draw a link 97 downwardly and operate a lever 103. Through the medium of its related spring elements 74 the lever rocks the three-increments stop element 68 into position to stop the rocker 34 related to the set of pawls 33 which in the same operation is brought into engagement with the feed rack. Operation of the key 203 therefore will result in a three-increments feed of the carriage. Similar key controlled mechanisms may be provided to advance-feed the carriage other multiple increments or a single increment.

*Index means used in typing corrective characters*

The described accurately functioning back spacing and advance spacing mechanisms are used in novel cooperation with index means shown in Figures 6 to 10 and 13, to the end of efficiently and accurately positioning the carriage, without guesswork, for the typing of corrective characters. Usually when one or more characters have been typed, the operator is unable to stop abruptly the fingering of the type keys before a few additional characters have been typed. Also, sometimes a typing error is discovered later or the operator prefers to proceed to a more logical point for stopping. Most often the erroneously typed character, as well as the character which is to be substituted therefor, is of three increments width, because a great majority of lower case characters are of such width. Generally there is no room to substitute wider incremental characters for narrower ones, but one unit narrower characters can be substituted without seriously affecting the quality of work. Many operators have found it extremely tedious and difficult to effect corrective character substitution because the various width characters do not type centered on the same spot and, moreover, the possible feed positions are at five incremental variance.

Referring now more particularly to Figure 6, a type bar 10 is indicated in dot and dash lines as having traveled to printing position and having entered a usual slot in a type guide 221. The shown type bar 10 includes a type head 10a of five-increments typing width, and imprints by such type head occupying the space between a left side margin 220 and a right side margin 225. Other types for typing two, three and four-increments characters will effect imprints having commonly the same left margin 220, but having their right margins respectively two, three and four increments from the said left margin, designated in the drawings respectively 222, 223 and 224. In Figure 6 the character "Z" has been erroneously typed instead of the character "A," that is the shown sequence of letters should spell "sample." To effect the required correction the platen 10 supporting the writing material is first rotated upwardly so that "Z" can be conveniently erased. Then the platen is turned downwardly until the typed word stands at the typing line, just above an aligning edge of a member 226. The said member 226 has indices 227 at various multiples of triple increments leftwardly or outwardly from the common left character imprint margin 220. It will now be seen that if the right side of the character which precedes the erased one is lined up with any index 227, in the manner illustrated in Figure 7, then the accurate printing position for typing the corrective character is rapidly obtainable by simply back spacing the carriage an appropriate number of times in accurate multiple-increment steps commensurate with the spacing of the indices 227. The stated alignment of the right side of the preceding character is easily obtainable by depressing the one increment back spacing key 139. Then the operator merely depresses the three-increments back spacing key 140 long enough so that there occur the appropriate number of back spacing operations which will place the erased spot approximately centered with the type guide 221. To aid the operator in knowing how many of the three-increments back spacing operations are required, the various indices 227 are identified by digits signifying the number of triple-increments back spacing operations they are distant from the said common left imprint margin 220, it being understood that the particular index is controlling whereto the right side of the stated character preceding the erasure is lined up. Back spacing the carriage in triple increments, as stated, brings the carriage to the exact required incremental position for filling in the corrective character, as is illustrated in Figure 8. While the digits associated with the indices 227 eliminate all guesswork as to the required number of triple-increments back spacing steps, it is not actually necessary for an operator to have reference thereto. This is because the carriage is back spaced in large steps and it is not difficult for the operator to determine visually when the erased spot reaches approximately the position above the type guide 221. Should the operator back space excessively, then the three increments advance space key 203 is available to get to the appropriate position.

Substitute first characters in a sequence, such as the first character in a word, must have their right margins adjoining directly the character following it. To enable the operator to place the carriage for such corrective typing efficiently, without guesswork and eye strain, there is provided at the right side of the type guide 10 another indices bearing member 230, see Figures 6, 9, 10 and 11. The member 230 has an index with an identifying digit "2," two triple-increments from the right margin 222 of the two-increments imprints. Similar indices with identifying digits "3," "4" and "5" are respectively three, four and five triple increments rightwardly of the right margins of the three, four and five increments imprints. Figure 9 indicates a first character of a word incorrectly typed and requiring correction. To make a substitution of a corrective character, the incremental width of the character to be substituted is first ascertained. This may be done from a table or by markings on the respective type key levers, or simply by memory. After the incorrect character has first been erased and the typed word has been lined up with either of the top edges of the members 226, 230, in the manner illustrated in Figure 10, the operator positions the carriage so that the left side of the character which is to be preceded by the corrective character, registers with the particular index of the member 230 which has the same digit value as the incremental width value of the substitute character that is to be typed. Thereupon, see Figure 11, the carriage is simply advanced by the three-increments space key 203 a number of steps which corresponds with the digit of the index to which the stated left side of the preceding character was registered.

In the particular example shown in Figures 9, 10 and 11, the substitute character is to be "s" which has a three-increments value. Therefore, as shown in Figure 10, the left side of the character "a" to be preceded by the corrective character "s" is lined up with the index identified by the digit 3. This same digit 3 is indicative of the number of three-increments spaces which must be imparted to the carriage so that the corrective character can be typed in the correct location as illustrated in Figure 11.

In Figure 13 is shown a modification of the feature just explained. It will be noted that the member 230 in Figure 13 has indices 232 close to each other. The index identified by the digit 2 on the said member is two triple increments rightwardly of the right imprint margin of the two-increments types. The index identified by the digit 3 is two triple increments rightwardly of the right imprint margin of the three-increments types. The indices identified by the digits 4 and 5 are similarly two triple increments rightwardly of the right imprint margins respectively of the four and the five increments types. Assuming now that a character which is to be preceded by a two-increments corrective character, is lined up with its left side matching the index 2, then two three-increments advance steps imparted to the carriage under the control of the key 203 will accurately place the carriage for the corrective typing of the stated two-increments character. A character to be preceded by a three-increments corrective character is lined up with its left side matching the index identified by the digit 3 and by spacing the carriage then twice in three increments steps, the required position is reached for the typing of the corrective three-increments character. The procedure for typing corrective characters of four and five increments value is similar, except that the indices identified by digits 4 and 5 are respectively used for carriage positioning reference. It should be understood the indices 227 and 231 can be provided in many different forms, such as by cut-ins or projections on the members 226, 230. If desirable the indices may be on transparent elements overlying the typing line. It is thus to be understood that the term index or indices should be given a broad meaning covering all equivalent means.

In reference to the members 226 and 230 it will be noted that the digits are significantly on the side of each index to which the character registration is to be effected.

Figure 4, which is a fractional rear view, illustrates a tabulator rack 234 embodying a row of key-set stops 235, in correlation with the feed rack 28. It will be evident that by back spacing the wheel 135 single tooth spaces, the carriage feed rack is back spaced single increments of a size one third of the spacing of the teeth 31. Thus by operating the single increments back space key lever 139 any of the tabulator stops 235 can be incrementally brought into registration with a stop setting element indicated at 236, the latter being operably carried on the machine frame. When such incremental registration has been brought about, the carriage then can be back spaced under control of the key 140, rapidly in agreement with the spacing of the tabulator stops 235, thereby to facilitate the setting of any one of such stops by the element 236. The numeral 237 designates a conventional tabulator counter stop.

Variations may be resorted to within the scope of the invention, and portions of improvements may be used without others. The scope of the invention is as indicated in the following claims.

I claim:

1. A back spacing mechanism for a typewriting machine carriage or the like, comprising in combination, a member having connection with said carriage for movement thereby and having a succession of teeth, back spacing means for engagement with the teeth of said member and capable of operating strokes terminating uniformly, back space key means adapted for a plurality of differential, single-key operations, means responsive to each of the differential operations of said key means to impart a uniformly terminating operating stroke to said back spacing means, means automatically controlled by said back space key means varyingly in dependence of each particular single-key differential operation thereof effected, to control said back spacing means in its operating stroke to move into engagement with said member at specific different numbers of teeth from its stroke termination, thereby to impart single-sweep movements of different extents to the carriage, and means to suppress excessive back spacing motion of the carriage comprising an element engageable by said back spacing means to limit the operating stroke of the latter uniformly and to hold the latter firmly engaged in the teeth of said member pending a return stroke thereof.

2. A back spacing mechanism for a typewriting machine carriage or the like, comprising in combination, a member having connection with said carriage for movement thereby and having a succession of uniformly spaced teeth, back space pawl means for engagement with the teeth of said member and capable of operating strokes terminating uniformly, back space key means adapted for a plurality of differential, single-key operations, power means responsive to said key means to impart an operating stroke to said back space pawl means, and means automatically controlled by said key means varyingly in dependence of each particular single-key differential operation thereof effected, to lead said back space pawl means in its operating stroke to engage said member at specific different numbers of teeth from its stroke termination thereby to impart single-sweep back spacing movements of different extents to the carriage.

3. A back spacing mechanism for a typewriting machine carriage or the like, comprising in combination, a member having connection with said carriage for movement thereby and having a succession of teeth, back spacing means for engagement with the teeth of said member and capable of uniformly terminating operating strokes, two back space keys, means responsive to either of said keys to impart uniformly terminating operating strokes to said back spacing means, and means controlled dependent upon whether one or the other of said keys is operated to control automatically said back spacing means in its operating stroke to engage said member different numbers of teeth from its stroke termination.

4. The invention set forth in claim 3, and a stationary abutment engageable by said back spacing means to terminate its operating strokes uniformly and by camming the back spacing means into firm engagement with said member to block thereby the carriage against excessive back spacing motion.

5. A back spacing mechanism for a typewriting machine carriage or the like, comprising in combination, a member having connection with said carriage for movement thereby and having a succession of teeth, pawl means for engagement with the teeth of said member and capable of back spacing strokes terminating uniformly, two back space keys, power means effectuatable by operation of either of said keys to impart uniformly terminating back spacing strokes to said pawl means, and means automatically controlled in dependence of whether one or the other of said keys is operated, to lead said pawl means in its operating strokes into engagement with said member one or another given number of teeth from its stroke termination, whereby automatically responsive to the operation of said one or said other of said keys said carriage will be back spaced in one sweep to one or another extent.

6. A back spacing mechanism for a typewriting machine carriage or the like, comprising in combination, a member having connection with said carriage for movement thereby and having a succession of uniformly spaced teeth, a back space element for engagement with the teeth of said member and capable of operating strokes terminating uniformly, differentially operable back space key means, power means effectuated by operation of said key means to impart an operating stroke to said back space element, means adapted for differential conditioning to lead said back space element in its operating stroke to begin to back space said member at different numbers of teeth from the stroke termination, and means dependent upon differential operation of said key means and including the said power means, to cause said conditionable means to lead said back space element differentially.

7. A back spacing mechanism for a typewriting machine carriage or the like, comprising in combination, a toothed member having connection with the carriage, an element adapted to be imparted uniformly ending operating strokes for back spacing action on said member, two back spacing keys, power means responsive to either of said keys to impart a cyclic operating stroke to said back spacing element, guiding means adapted to be given one or another condition to guide said element in its operating stroke to pick up said member at one or another point, including a guide operable to a certain position to give said guiding means one of said conditions, means connectable for operation by said power means to thereby operate said guide, and means to connect said connectable means in response to the operation of only one of said keys.

8. In a typewriting machine having a carriage, the combination with proportional letter-feeding means for said carriage, comprising a member having a succession of teeth and comprising further dog means normally in tooth-hold with said member and having capacity for movement in a sense counter to letter-feeding for taking new toothholds in said teeth for movement subsequently by the carriage limitedly to measure out thereto proportional feed steps, of means to back-space the carriage, and means operated in conjunction with said back-spacing means to hold said dog means against back spacing with said member and cause the teeth of said member to ratchet by said dog means while the carriage receives its back spacing movement.

9. In a typewriting machine having a carriage, the combination with proportional letter-feeding means for said carriage, comprising a member having a succession of teeth and comprising also dog means for movement in space-measuring engagement with said member to varied positions and normally in engagement with such member in any of such positions to hold the carriage in a feed position, of back space control means, means responsive to said control means to impart a back spacing step to the carriage, and means additionally responsive to said control means to hold said dog means against back spacing motion by said member in whatever varied position it may occupy.

10. The invention set forth in claim 9, said holding means comprising, tooth means associated with said dog means to take up varied positions in dependence of the varied position the dog means may occupy, and other tooth means operable into engagement with said first tooth means.

11. In a typewriting machine, the combination with a letter-feeding carriage, of a member having a succession of teeth and operatively connected with said carriage, two alternately active stepping means adapted for limited operation to varied positions to measure out alternately varied feeding steps to said member and thereupon being in control of said member, back space control means, means responsive to said control means to impart a back spacing step to said carriage, and means responsive also to said control means to hold that stepping means which has been in control of said member so that it will ratchet over the teeth of said member as back spacing takes place.

12. In a typewriting machine having a letter feeding carriage, a member having a succession of teeth and operatively connected with said carriage, two alternately active stepping means adapted for limited operation to varied positions to measure out alternately feeding steps of differing numbers of feeding increments, a plurality of back spacing keys, back space means differentially responsive to the individual back spacing keys to back space the carriage by different numbers of feeding increments, and means responsive to either of said back spacing keys to hold the stepping means which happens to be in control, so that it will not back space along with the member and will ratchet over the teeth thereof as back spacing takes place.

13. A proportional spacing typewriting machine comprising in combination, a frame member, a letter-feeding carriage member, types carried for operation on one of said members and adapted to effect on a typing line, character imprints of different widths which have all one common side margin fixed in respect to the type-carrying member and which variously have opposite side margins different multiples of a given increment from the said common side margin, a proportional letter-feed mechanism to feed the carriage incrementally in accord with the width of each character imprint being made, indices provided along said typing line at various multiples of a certain multiple of said given increment outwardly from the said common side margin, means to move said carriage stepwise in accord with said given increment, enabling the lining up of the right side of any typed character with any of said indices, and means to back space said carriage stepwise in accord with the said certain multiple of said given increment at which said indices are provided.

14. A proportional spacing typewriting machine comprising in combination, a frame member, a letter-feeding carriage member, types carried for operation on one of said members and adapted to effect on a typing line, character imprints of different widths which have all one common side margin fixed in respect to the type-carrying member and which variously have opposite side margins different multiples of a given increment from the said common side margin, a proportional letter-feed mechanism to feed the carriage incrementally in accord with the width of each character imprint being made, indices provided along said typing line at various multiples of a certain multiple of said given increment outwardly from the said common side margin, means to move said carriage stepwise in accord with said given increment, enabling the lining up of the next side of any typed character with any of said indices, and means to back space said carriage stepwise in accord with said given increment or stepwise in accord with the said certain multiple of said given increment, comprising a toothed member, a single back space pawl for back spacing action on said toothed member, two back spacing keys, means differentially responsive to said keys to control and actuate said back space pawl to engage said toothed member after varied distances of travel free thereof for stepwise back spacing said member in single increments or in the said certain multiple of said increment and at each actuation ending uniformly moved in engagement with said toothed member, and an element engageable by said pawl to limit its actuation and to cause it to coact with said toothed member to suppress back spacing overthrow of the carriage.

15. A proportional spacing typewriting machine comprising in combination a letter-feeding carriage, a type guide, types adapted to be directed by said type guide to effect on a typing line, character imprints of different widths which have all one common left margin fixed relative to said type guide and which variously have side margins at different multiples of a given feed increment from the said common left side margin, a proportional letter-feed mechanism to feed the carriage incrementally in accord with the width of each character imprint being made, indices provided along said typing line at various multiples of a certain multiple of said given increment outwardly from the said common left side margin, means to back-space said carriage stepwise in accord with said given increment, enabling the lining up of the right side of any typed character with any of said indices, and means to back space said carriage stepwise in accord with the said certain multiple of said given increment at which said indices are arranged.

16. In a proportional spacing typewriting machine, in combination, a frame member, a letter-feeding carriage member, types carried for printing operation on one of said members and adapted to effect on a typing line, character imprints of different widths which have all one common side margin fixed in respect to the type carrying member and which variously have opposite side margins at different multiples of a given increment from the said common side margin, a proportional letter-feed mechanism to feed the carriage member incrementally corresponding to the width of each character imprint being made, indices provided along said typing line at various multiples of a certain multiple of said given increment outwardly from asid common left side margin, means to move said carriage member stepwise corresponding to said given increment, enabling the lining up of the right side of any typed character with any of said indices, means to back space and means to advance space said carriage member stepwise in accord with the said certain multiple of said given increment at which said indices are arranged, and other indices provided along the typing line outwardly from the several of said opposite imprint side margins at multiples of said certain multiple of said increment, whereby if the left side of a typed character to be preceded by a corrective character is lined up with that particular one of said other indices which is a multiple of said certain multiple of said increment outwardly from the particular right printing margin of the corrective character to be printed, said multiple increments spacing means can then be used to bring the carriage member speedily and accurately to the required position for typing the corrective character.

17. In a proportional spacing typewriting machine, in combination, a frame member, a letter-feeding carriage member, types carried for printing operation on one of said members and adapted to effect on a typing line, character imprints of different widths which have all one common side margin fixed in respect to the type carrying member and which variously have opposite side margins at different multiples of a given increment from said common side margin, a proportional letter-feed mechanism to feed said carriage member incrementally corresponding to the width of each character imprint being made, indices provided along said typing line from the several of said imprint side margins at multiples of a certain multiple of said increment, and means to move said carriage member stepwise corresponding to said given increment and also stepwise corresponding to said certain multiple of said increment.

18. In a proportional spacing typewriting machine, in combination, a frame member, a letter-feeding carriage member, types carried for printing operation on one of said members and adapted to effect on a typing line, character imprints of different widths which have all one common side margin fixed in respect to the type carrying member and which variously have opposite side margins at different multiples of a given increment from said common side margin, a proportional letter-feed mechanism to feed said carriage member incrementally corresponding to the width of each character imprint being made, indices provided along said typing line from the several of said imprint side margins at progressive multiples of a certain multiple of said increment, and means to move said carriage member stepwise corresponding to said given increment and also stepwise corresponding to said certain multiple of said increment.

19. In a proportional spacing typewriting machine, in combination, a frame member, a letter-feeding carriage member, types carried for printing operation on one of said members and adapted to effect on a typing line, character imprints of different widths which have all one common side margin fixed in respect to the type carrying member and which variously have opposite side margins at different multiples of a given increment from said common side margin, a proportional letter-feed mechanism to feed said carriage member incrementally corresponding to the width of each character imprint being made, and indices provided along said typing line from the several of the said opposite side margins at a specific multiple of said increment.

20. A back spacing mechanism for a typewriting machine carriage or the like, comprising in combination, a toothed member having connection with the carriage, an element adapted to be imparted uniformly ending operating strokes for back spacing action on said member, two back spacing keys, power means responsive to either of said keys to impart a cyclic operating stroke to said back spacing element, guiding means adapted to be given one or another condition to guide said element in its operating stroke to pick up said member at one or another point, comprising two guides, one stationary and the other movable between a normal and an operated position to give said guiding means said one or said other condition, and means to operate said movable guide in response to the operation of only one of said keys.

21. A back spacing mechanism for a typewriting machine carriage or the like, comprising in combination, a member having connection with the carriage for movement thereby and having a succession of teeth, back spacing means for engagement with the teeth of said member and capable of operating strokes terminating uniformly, back space key means adapted for a plurality of differential, single-key operations, power means adapted for single or repeat operations to impart one or more operating strokes to said back spacing means, means responsive to any of said single-key differential operations of said key means to institute one operation of said power means and under control of at least one of such differential operations of said key means, when sustained, to cause additional operations of the power means to ensue, the power means completing each started operating stroke, guiding means for said back spacing means conditionable by said back space key means varyingly in dependence of each effected differential single-key operation thereof to guide said back spacing means during operating strokes into engagement with said member at different numbers of teeth from its stroke termination, thereby to govern the magnitude of the back spacing movements imparted to said member, and means to sustain each established condition of said guiding means until following each restoration of the key means the back spacing means has completed its started operating stroke.

References Cited in the file of this patent

UNITED STATES PATENTS

| | | |
|---|---|---|
| 1,133,004 | Carlin | Mar. 23, 1915 |
| 1,141,558 | Kurowski | June 1, 1915 |
| 1,178,806 | Howieson | Apr. 11, 1916 |
| 2,088,064 | Koca | July 27, 1937 |
| 2,185,742 | Thompson | Jan. 2, 1940 |